No. 664,684.  
F. G. & G. L. SCOTT.  
RUNNER FOR WAGONS OR CARRIAGES.  
(Application filed Sept. 7, 1900.)
(No Model.)
Patented Dec. 25, 1900.
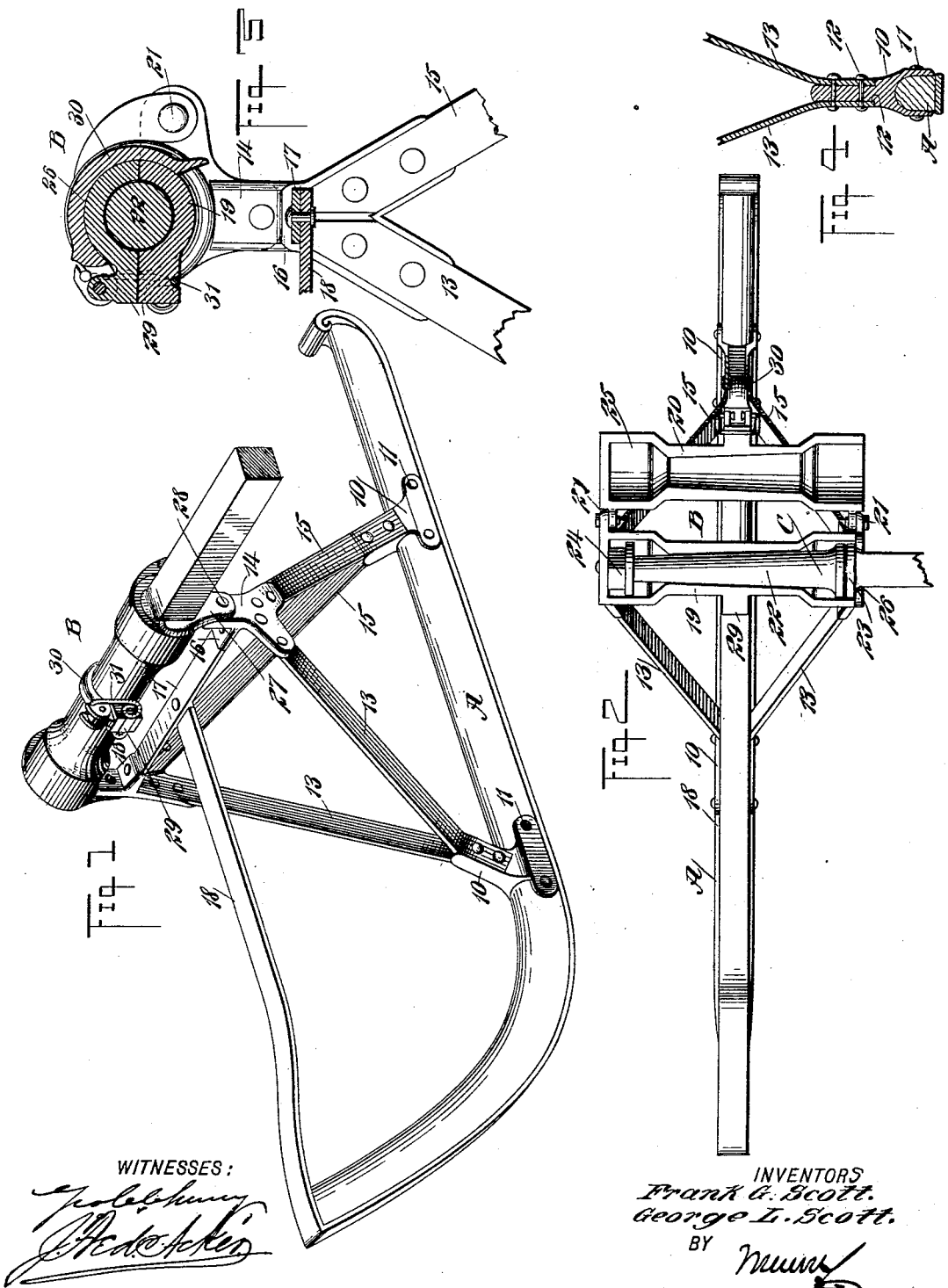
WITNESSES:
INVENTORS  
Frank G. Scott.  
George L. Scott.  
BY  
ATTORNEYS

UNITED STATES PATENT OFFICE.

FRANK GARDNER SCOTT AND GEORGE LAWTON SCOTT, OF NEWPORT, RHODE ISLAND.

RUNNER FOR WAGONS OR CARRIAGES.

SPECIFICATION forming part of Letters Patent No. 664,684, dated December 25, 1900.

Application filed September 7, 1900. Serial No. 29,285. (No model.)

*To all whom it may concern:*

Be it known that we, FRANK GARDNER SCOTT and GEORGE LAWTON SCOTT, citizens of the United States, and residents of Newport, in the county of Newport and State of Rhode Island, have invented new and Improved Runners for Wagons or Carriages, of which the following is a full, clear, and exact description.

The purpose of the invention is to provide a runner for wagons and other vehicles which will have a box-bearing so constructed that the axle-nut and collar will be received therein, as well as the axle-spindle, and, further, to so construct the box-bearing that the runner cannot work off the axle, which latter is at all times covered and not exposed to the weather, and so that the runner is prevented from working on the axle to any detrimental extent.

A further purpose of the invention is to so construct the runner and its bearing for the axle that no interference is possible between the runner and the straps and braces of the vehicle to which the runner is applied and also so that the runners when applied to the axles of a vehicle will track the same, as would wheels mounted on the axles.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved runner, illustrating its application to an axle. Fig. 2 is a plan view of the runner, the box-bearing for the axle being open, disclosing the axle-spindle contained in said bearing. Fig. 3 is a transverse section taken through the box-bearing and axle and through the fastening device for the box-bearing, and Fig. 4 is a detail sectional view through the runner and a socket-section applied thereto and braces carried by the socket-section.

A represents a bob-runner, and at the forward and rear portions of this runner socket-sections 10 are located, the lower portions of which socket-sections straddle the runner and are secured thereto by bolts or rivets 11 or similar devices. Each socket-section at its upper portion is provided with a recess 12 in both its front and its rear side, and the upper portions of the socket-sections are inclined in the direction of each other. The lower ends of braces 13 are secured in any suitable or approved manner in the recesses 12 of the forward socket-section 10. These braces 13 diverge from the socket-section to which they are attached and extend upward and rearward, their upper ends being secured to the lower forward members of connecting-blocks 14, which blocks are bifurcated at their lower portions, as illustrated in Fig. 1. The rear lower members of the connecting-blocks 14 are attached to the upper ends of rear braces 15, and these rear braces extend downward and rearward, converging as they approach the rear socket-section 10, in the recessed portions of which rear socket-section the lower ends of the rear braces 15 are secured. The connecting-blocks 14 are provided at their inner faces with recessed lugs 16, and the connecting-blocks are in their turn united by a cross-bar 17, which extends from one recessed lug 16 to the other, as is best shown in Fig. 1, and a horizontal brace 18 is suitably attached to the central portion of the cross-bar 17 and to the upper forward end of the runner A. In fact, the longitudinal brace 18 may be a continuation of the iron secured to the working surface of the runner.

In connection with each runner a box-bearing B is employed. This box-bearing B is divided into two parts, embracing, therefore, a bottom section 19 and an upper section 20, the two sections being adapted to close one upon the other and form a complete box. The sections 19 and 20 of the bearing-box are connected by hinges 21, as shown in Fig. 2, and the inner chamber of each section at its center is made tapering to snugly receive the tapering portion 22 of an axle-spindle C. This spindle is provided with the usual collar or collars 23, where it connects with the axle proper, and when an axle-spindle is placed within a bearing-box the lock-nut 24 remains on the spindle, so that this nut will not be lost, and therefore at each end of each section of a bearing-box B an enlargement 25 is provided.

The outer end of each section 19 and 20 of the bearing-box is closed; but the inner end of the upper section 20 of the bearing-box is open, while the inner end of the lower section 19 is provided with a square jaw 26, which neatly receives the rectangular portion of the axle of which the spindle forms a part. This jaw 26 prevents the runner from working detrimentally on the spindle, while the box-bearing effectually prevents the runner from working off from the axle and protects the axle-spindle at all times.

An ear 27 extends down from each end of the lower section 19 of a box-bearing, and these ears are pivotally connected by suitable pins 28 with the outside faces of the upper portions of the connecting-blocks 14, and the upper end portions of these connecting-blocks have bearing against the under face of the lower section 19 of a bearing-box to such an extent as to prevent the runner from jumping or working up at the front beyond a certain point. The sections 19 and 20 of the box-bearing B may be connected by bolts passed through lugs 29, located on said sections, adapted to be brought one beneath the other, or the catch illustrated in the drawings or a similar catch may be employed. The catch shown consists of a curved lever 30, which has an eccentric end pivotally connected with an extension from the lug 29, carried by the upper section of the box-bearing, as shown in Figs. 1 and 3, and a spring-loop 31 is attached to the eccentric portion of the lever 30, said spring-loop when the sections of the box are closed and the lever 30 is thrown forward being adapted to engage with the under surface of a lug 29 on the lower section of the box-bearing, and the loop exerts a locking tension on the two lugs when the lever 30 is carried down to an engagement with the outer surface of the upper section of the box-bearing.

Having thus described our invention, we claim as new and desire to secure by Letters Patent—

1. In a runner for wagons and carriages, a bearing-box constructed in sections adapted for engagement with each other, each section having its interior provided with a tapering central chamber and enlarged end chambers connected with the tapering chamber, the outer ends of the sections of the bearing-box being closed, the inner end of the upper section opened and the inner end of the lower section provided with a square jaw adapted to receive the square portion of an axle when the spindle of the axle is within the box-casing, substantially as described.

2. In a runner for wagons and carriages, a bearing-box constructed in sections adapted for engagement with each other, each section having its interior provided with a tapering central chamber and enlarged end chambers connected with the tapering chamber, the outer ends of the sections of the bearing-box being closed, the inner end of the upper section opened and the inner end of the lower section provided with a square jaw adapted to receive the square portion of an axle when the spindle of the axle is within the box-bearing, a locking device for the sections of the box-bearing, supports upon which the box-bearing is pivoted, which supports are adapted for connection with a runner, the upper ends of the said supports being adapted for engagement with the bottom of the box-bearing, preventing the runner from tilting up at the front beyond a certain point, as and for the purpose specified.

3. In a runner for wagons and carriages, the combination, with a bob-runner, socket-sections secured to the said bob-runner, having their upper sections inclined in direction of each other, braces attached to opposite sides of the socket-sections, extending upward in diverging lines, connecting-blocks to which the braces are attached, and a connecting-bar for the connecting-blocks, of a box-bearing for an axle-spindle pivotally attached to the connecting-blocks, which box-bearing is constructed in two sections, each section having an inner centrally-located conical chamber, enlarged end chambers connecting with the conical chambers, the outer end of each of the said sections being closed and the inner end of the upper section open, the inner end of the lower section of the bearing-box being provided with a square jaw, and a locking device for the sections of the box, for the purpose specified.

4. In a runner for wagons and carriages, the combination with an axle-box formed of sections hinged together, each section being provided with a lug at its free edge, of a curved lever pivoted to the lug of one of the box-sections, and a loop engaging the pivoted end of the lever and the lug of the other box-section, substantially as described.

5. In a runner for wagons and carriages, the combination with an axle-box formed of an upper and lower section, the sections being hinged together and each provided with a lug at its free edge, of a curved lever having an eccentric end pivoted to the lug of the upper box-section, and a spring-loop carried by the eccentric end of the lever and adapted to engage the under surface of the lug of the lower box-section, substantially as described.

6. In a runner for wagons or carriages, the combination with a runner, of braces secured a distance apart to the runner and each having diverging members, blocks to which the upper end of a member of each brace is secured, a two-part axle-box having its lower section pivoted to the said blocks, and means for locking the sections of the axle-box together, substantially as described.

7. In a runner for wagons or carriages, the combination with a runner, of braces secured a distance apart to the runner and each having diverging members, blocks to which the upper end of a member of each brace is secured, a cross-bar connecting the blocks, an axle-box formed of two hinged sections, the lower section being pivotally connected with the said blocks, and means for locking the box-sections together, substantially as described.

In testimony whereof we have signed our names to this specification in the presence of two subscribing witnesses.

FRANK GARDNER SCOTT.
GEORGE LAWTON SCOTT.

Witnesses:
CLARK BURDICK,
SADIE A. HARVEY.